Aug. 3, 1948.  C. F. YATES ET AL  2,446,358
LIQUID SEAL PULSATION DAMPENER
Filed Aug. 3, 1946
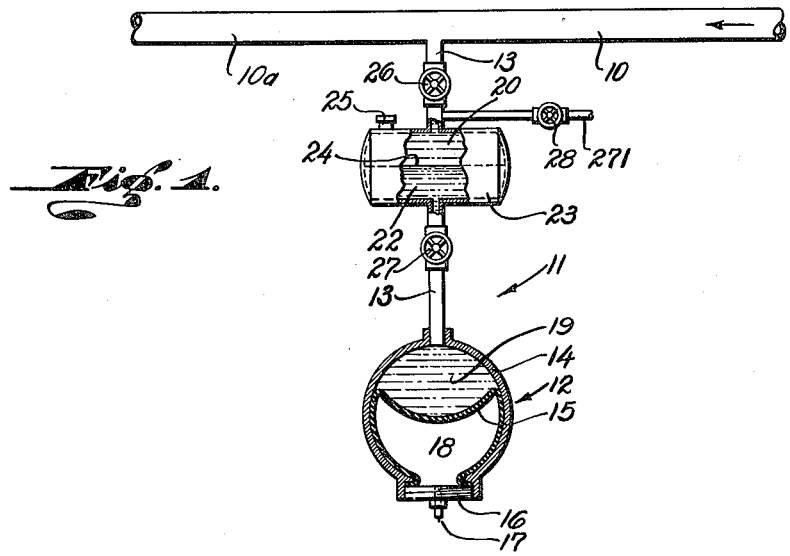
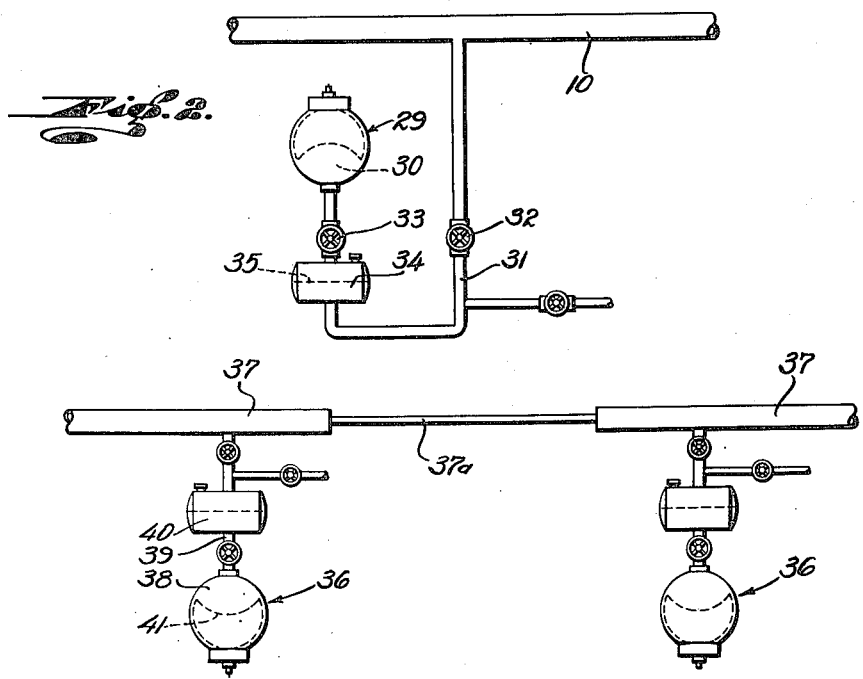
Cecil F. Yates
Claude B. Nolte
INVENTOR.
BY
ATTORNEY Patented Aug. 3, 1948

2,446,358

UNITED STATES PATENT OFFICE 2,446,358

LIQUID SEAL PULSATION DAMPENER

Cecil F. Yates, North Hollywood, and Claude B. Nolte, Altadena, Calif., assignors to The Fluor Corporation, Ltd., Los Angeles, Calif., a corporation of California Application August 3, 1946, Serial No. 688,242

5 Claims. (Cl. 138—30)

This invention relates generally to systems for removing pulsations from fluid streams, and particularly for the elimination of pulsations in liquid streams, the character and composition of which renders parts of the pressure responsive dampener subject to attack or disintegration by the liquid.

Specifically, the invention relates to a type of pulsation dampening equipment employing a pressure responsive diaphragm in communication with the liquid line, and subjected also to gas pressure in such relation to the line pressure that the gas undergoes compression and expansion, respectively in response to increasing and decreasing line pressures created by the pulsations occurring in the liquid stream. In many types of installations, the pressure responsive diaphragm, if directly contacted by the line liquid, may be subject to attack for any of various reasons, as for example the solvent or chemically reactive effect of the liquid on the diaphragm material. Accordingly, our primary object is to provide for the maintenance of the diaphragm out of contact with the line liquid, while permitting free transmission of the line stream pulsations to the diaphragm. Briefly, this object is accomplished by the placement between the line and the diaphragm of a fluid seal, constituted by a liquid different from and preferably immiscible with the line liquid. As will appear, the seal liquid also is desirably of different specific gravity than the line liquid, and the seal connection or structure may be adapted to the use of sealing liquids of greater or lesser specific gravity than the line liquid.

The invention, together with its various features and objects, will be understood to best advantage by reference to the accompanying drawing illustrating certain typical embodiments, and in which:

Fig. 1 is a sectional view showing a single capacitance form of the invention;

Fig. 2 illustrates in elevation a variational form of the same type; and

Fig. 3 illustrates a second variational form employing a plural arrangement of line connected capacitances.

Referring first to Fig. 1, assume the pipe 10 to carry a continuously flowing stream of liquid transmitting pulsations created from whatever source, as for example a piston-type pump. Pulsations are dampened or substantially eliminated from the liquid reaching the down stream side 10a of the line by a pressure responsive assembly, generally indicated at 11, comprising by analogy to an electrical filtering system, the capacitance 12 having a pipe connection 13 with the line 10.

The capacitance 12 is of a diaphragm-gas chamber type comprising typically a spherical vessel 14 containing a bladder-like flexible diaphragm 15 capable, upon full distention, of conforming to the spherical shape of the vessel. The neck of the bladder is suitably clamped to the shell at the inside of a closure 16 containing a valve 17 through which the bladder chamber 18 is charged with gas under determinable pressure. As illustrated, liquid chamber 19 at the opposite side of the diaphragm is in pressure communication with line 10 through the pipe 13. With respect to the operation of the dampener, it will suffice to state that elimination of pulsations in the line stream occurs by virtue of the transmission of pressure surges to the diaphragm 15, and the compensating effect of compression and expansion of the gas in the closed diaphragm chamber 18, occurring in response to deflections of the diaphragm.

As previously indicated, the composition of the line liquid 20 may be such as to injure the diaphragm if permitted to directly contact it. Accordingly, for protection of the diaphragm, a different, and in the system of Fig. 1, heavier liquid 22 which is not injurious to the diaphragm, is interposed between the latter and the line liquid 20. For accommodation of a quantity of the liquid 22 which will avoid necessity for replacement over extended periods of operation, we place in line 13 a chamber 23 within which the two immiscible liquids 20 and 22 are in contact at the interface 24. The protective liquid 22 may be filled into the system through a normally closed opening 25 in the chamber 23.

The chamber 23, and if desired also the vessel 14, may be closed from communication with the line 10 by valves 26 and 27. When gas is to be charged through the valve 17 into the diaphragm chamber 18 at accurately determinable pressure, it may be desirable to expel all liquid from the vessel. Liquid then may be completely displaced by the diaphragm from chamber 19 by opening the draw-off line 271 normally closed by valve 28. As will be observed, the seal liquid 22 in the system of Fig. 1, is of greater specific gravity than the line liquid 20.

Fig. 2 illustrates a variational form of the invention adapted for the accommodation of a sealing or protective liquid, immiscible with the line fluid, and of lighter specific gravity. Here the diaphragm-containing vessel 29, inverted from the position of the vessel in Fig. 1, has its liquid chamber 30 in communication with the line 10 through the return bend pipe 31 containing valves 32 and 33. Chamber 34 contains a portion of the lighter seal liquid extending up into the chamber 30, above the liquid interface 35.

The second variational form appearing in Fig. 3 constitutes a plural arrangement of capacitances 36 connected with the pulsating liquid line 37, at opposite sides of a resistance in the line, preferably in the form of an extended, relatively restricted inductance passage contained within a reduced diameter section 37a of the line. For more detailed explanation of the function and theory of operation of this dual capacitance type system, reference may be had to copending application Ser. No. 631,192, filed November 27, 1945, on "Pulsation elimination in liquid streams." As will be apparent, the individual capacitances may have their vessels 38 in communication with line 37 through pipe 39 and chamber 40, with the protective liquid column contacting the diaphragm 41, in accordance with either of the specific arrangements described with reference to Figs. 1 and 2.

Generally speaking, any suitable liquid, different from and immiscible with the system or line liquid, may be used as the sealing medium. As illustrative, where the system liquid may be an aqueous solution which if permitted to enter the gas-charged vessel would tend to attack the diaphragm or vessel, the sealing liquid may consist of a lighter than water liquid, such as oil (accommodated in a system like Fig. 2), or a heavier than water liquid such as mercury (to be used in a system like Fig. 1). Assuming an oil to constitute the line or system liquid, the sealing liquid may be water, mercury, glycerine, a glycol, or aqueous solution having a boiling temperature above that of water.

We claim:

1. Apparatus for eliminating pulsations in a fluid stream flowing through a line, comprising a vessel, a flexible diaphragm within and having one side exposed to gas in said vessel, a pressure transmitting connection between said line and the vessel at one side of the diaphragm, said connection containing a diaphragm protective fluid different from the stream fluid and contacting the diaphragm, and means for maintaining the pressure of said gas against the diaphragm so that the gas is compressed and expanded respectively in response to increases and decreases of said fluid stream pressure.

2. Apparatus for eliminating pulsations in a fluid stream flowing through a line, comprising a vessel, a flexible diaphragm within and having one side exposed to gas in said vessel, a pressure transmitting connection between said line and the vessel at one side of the diaphragm, said connection containing a diaphragm protective fluid immiscible with the stream fluid and contacting the diaphragm, and means for maintaining the pressure of said gas against the diaphragm so that the gas is compressed and expanded respectively in response to increases and decreases of said fluid stream pressure.

3. Apparatus for eliminating pulsations in a liquid stream flowing through a line, comprising a vessel, a flexible diaphragm within and having one side exposed to gas in said vessel, a pressure transmitting connection between said line and the vessel at one side of the diaphragm, said connection containing a diaphragm protective liquid immiscible with and heavier than the stream liquid and contacting the diaphragm, and means for maintaining the pressure of said gas against the diaphragm so that the gas is compressed and expanded respectively in response to increases and decreases of said liquid stream pressure.

4. Apparatus for eliminating pulsations in a liquid stream flowing through a line, comprising a vessel, a flexible diaphragm within and having one side exposed to gas in said vessel, a pressure transmitting connection between said line and the vessel at one side of the diaphragm, said connection containing a diaphragm protective liquid immiscible with and lighter than the stream liquid and contacting the diaphragm, and means for maintaining the pressure of said gas against the diaphragm so that the gas is compressed and expanded respectively in response to increases and decreases of said liquid stream pressure.

5. Apparatus for eliminating pulsations in a fluid stream flowing through a line, comprising a vessel, a flexible diaphragm within and having one side exposed to gas in said vessel, a pressure transmitting pipe connection between said line and the vessel at one side of the diaphragm, said connection including an enlarged chamber containing a diaphragm protective fluid immiscible with the stream fluid and contacting the diaphragm, said fluids being in contact at an interface within the chamber, and means for maintaining the pressure of said gas against the diaphragm so that the gas is compressed and expanded respectively in response to increases and decreases in said liquid stream pressure.

CECIL F. YATES.
CLAUDE B. NOLTE.

REFERENCES CITED

The following references are of record in the file of this patent:

UNITED STATES PATENTS

| Number | Name | Date |
|---|---|---|
| 2,042,421 | Atkinson et al. | May 26, 1936 |
| 2,166,405 | Hait | July 18, 1939 |
| 2,290,337 | Knauth | July 21, 1942 |